(12) United States Patent
Shaeffer et al.

(10) Patent No.: US 6,300,787 B1
(45) Date of Patent: Oct. 9, 2001

(54) SYSTEM AND METHOD FOR OBSERVING INFORMATION TRANSMITTED BETWEEN TWO INTEGRATED CIRCUITS

(75) Inventors: Ian P. Shaeffer, San Jose, CA (US); Robert D. Snyder, Ouistreham (FR)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/561,723

(22) Filed: May 1, 2000

(51) Int. Cl.$^7$ .................................................. H03K 19/00
(52) U.S. Cl. .................................... 326/16; 326/14; 326/9
(58) Field of Search .................................. 326/16, 30, 86, 326/9, 14

(56) References Cited

U.S. PATENT DOCUMENTS

| | | | |
|---|---|---|---|
| 5,600,790 | * | 2/1997 | Barnstijn et al. ................ 395/183.14 |
| 5,715,387 | * | 2/1998 | Barnstijn et al. ................ 395/183.4 |
| 6,233,613 | * | 5/2001 | Walker et al. ....................... 709/224 |

* cited by examiner

*Primary Examiner*—Michael Tokar
*Assistant Examiner*—Anh Q. Tran

(57) ABSTRACT

A system and method for observing bi-directional information transmitted between two integrated circuits is disclosed. The bi-directional information is transmitted on first and second communication links between a first and a second integrated circuit. The second integrated circuit includes a first data port electrically coupled to the first and second communication links. A second data port of the second integrated circuit is electrically coupled to the first communication link at the first data port of the second integrated circuit. The second data port is capable of electrical connection with an analyzing device. A third data port of the second integrated circuit is electrically coupled to the second communication link at the first data port of the second integrated circuit. A third communication link electrically couples the third data port of the second integrated circuit to a first data port of a third integrated circuit. A second data port of the third integrated circuit is electrically coupled to the first data port of the third integrated circuit, the second data port capable of electrical connection with the analyzing device.

17 Claims, 3 Drawing Sheets

US 6,300,787 B1

SYSTEM AND METHOD FOR OBSERVING INFORMATION TRANSMITTED BETWEEN TWO INTEGRATED CIRCUITS

THE FIELD OF THE INVENTION

The present invention relates generally to observing communications between a pair of electrical components within a system, and more specifically to observing a bi-directional communication link between two integrated circuits for the purposes of analyzing and debugging the system.

BACKGROUND OF THE INVENTION

The sophistication of a present-day electronic system is a result of complex functions handled by integrated circuits making up the electronic system. Within a single silicon chip or wafer, numerous integrated circuits are fabricated. Each integrated circuit may comprise many millions of transistors, including associated diodes, resistors, and capacitors, interconnected to form complex electronic systems capable of performing various functions.

Semiconductor integrated circuits comprise the majority of electronic circuits in computers and other digital electronic products. Integrated circuits can be configured, for example, as a central processing unit (CPU), a programmable logic array (PLA), an application specific integrated circuit (ASIC), or a digital signal processor (DSP). Both the sophistication and speed of operation of these integrated circuits has rapidly increased due to improvements in integrated circuit manufacturing technologies resulting in smaller and faster devices.

Once a computer or another digital electronic product is manufactured, it is important to test various aspects of the system to verify proper operation. For example, the interconnection between two integrated circuits must be verified. In addition, it must be verified that a specific integrated circuit is operating properly. In most circumstances, the communication between two integrated circuits is facilitated by a data bus, which includes first and second communication links. The first and second communication links provide bi-directional communication between the first and second integrated circuits such that communication in a first direction is provided by a first communication link while communication in a second direction is provided by the second communication link.

In order to test or "debug" systems having bi-directional communication links between two integrated circuits, prior art analyzation systems included an analyzing device, such as a logic analyzer or an oscilloscope. The analyzing device includes two leads which are electrically connected to the first and second communication links. During a testing operation of the system, the analyzing device observes the data being communicated between the first and second integrated circuits via the first and second communication links. This information is then compared to information which is expected to be observed between the first and second integrated circuits. If the two sets of information coincide, it is assumed that the communication links and adjacent integrated circuits are properly installed and functioning. Conversely, if the two sets of information do not coincide, it is assumed that a portion of the system is not operating as designed.

Another prior art embodiment for testing and debugging a system includes dedicating numerous pins within an integrated circuit for repeating or copying a communication link, which may be observed without disrupting normal operation of the system. However, this approach is very costly in terms of chip pinout, in that numerous additional pins are dedicated solely for test purposes, rather than operational purposes.

The speed with which computers and electronic devices operate has drastically increased in the recent past. For example, computers are capable of operating at frequencies in the high megahertz to gigahertz range. However, the technology relating to analyzing devices such as logic analyzers or oscilloscopes, has not increased in such magnitude. Rather, most analyzing devices are not capable of operating at frequencies in the mid megahertz to low gigahertz range. Thus, interconnecting an analyzer device directly to communication lines within a present day electronics system will disrupt and disturb the normal operation of the system, perhaps rendering the system inoperable. Therefore, there is a need for a system and method which will permit observation and debugging of bi-directional information transmitted on first and second communication links between first and second integrated circuit such that the overall performance of the system will not be inhibited and that a minimal number of pins are used.

SUMMARY OF THE INVENTION

The present invention provides a system and method for observing bi-directional information transmitted on a first and a second communication link between a first and a second integrated circuit to determine proper operation of the communication links and integrated circuits such that the performance of the overall system is not inhibited.

One embodiment of the invention includes a system for observing bi-directional information transmitted on a first and a second communication link between a first data port of a first integrated circuit and a first data port of a second integrated circuit. The system includes a second data port of the second integrated circuit, the second data port electrically coupled to the first communication link at the first data port of the second integrated circuit. The second data port of the second integrated circuit is capable of electrical connection with an analyzing device, such as a logic analyzer or an oscilloscope. A third data port of a second integrated circuit is electrically coupled to the second communication link at the first data port of the second integrated circuit. A third communication link electrically connects the third data port of the second integrated circuit to a first data port of a third integrated circuit. A second data port of the third integrated circuit is electrically coupled to the first data port of the third integrated circuit, a second data port capable of electrical connection with the analyzing device.

In one embodiment of the invention, the second data ports of the second and third integrated circuits are dedicated debugging ports, solely for facilitating an analyzing function. In another embodiment of the invention, the debugging ports of the second and third integrated circuits may be standard data ports capable of facilitating the communication of data between the second and third integrated circuits, respectfully, and other electrical components or integrated circuits of the overall system.

In another embodiment of the present invention, the second ports of the second and third integrated circuits, while being dedicated debugging ports, may each include in the range of approximately 50–250 data pins.

The present invention also includes a method of observing bi-directional information transmitted on a first and a second communication link electrically connected between a first integrated circuit and a second data port of a second integrated circuit. The method includes electrically coupling the first communication link from the first data port of the second integrated circuit to a second data port of the second integrated circuit, while the second communication link is electrically coupled from the first data port of the second integrated circuit to a third data port of the second integrated circuit. Further, a third communication link is electrically coupled from a third data port of the second integrated circuit to a first data port of a third integrated circuit, which in turn is electrically coupled to a second data port of the third integrated circuit. The first communication link at the second data port of the second integrated circuit and the second communication link at the second data port of the third integrated circuit can be observed by an analyzing device, such as a logic analyzer or an oscilloscope, electrically coupled to the second data ports of the second and third integrated circuits.

In one embodiment of the invention, the second data ports of both the second and third integrated circuits are each dedicated debugging ports. The dedicated debugging ports may each have in the range of 50–250 data pins per debugging port. In another embodiment, the second data ports of the second and third integrated circuits are each dedicated data ports capable of interconnecting the second and third integrated circuits to other electrical components or integrated circuits of the overall system.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Testing electrical components and electrical connections between components has become a standard general practice in the computer industry. Once a computer or electronic device has been manufactured, the computer or electronic device undergoes a test procedure to ensure the proper connection and operation of various components and interfaces, such as data buses between components. A well-known method of analyzing the bi-directional interconnection between two integrated circuits is illustrated in FIG. 1.

Figure 1:
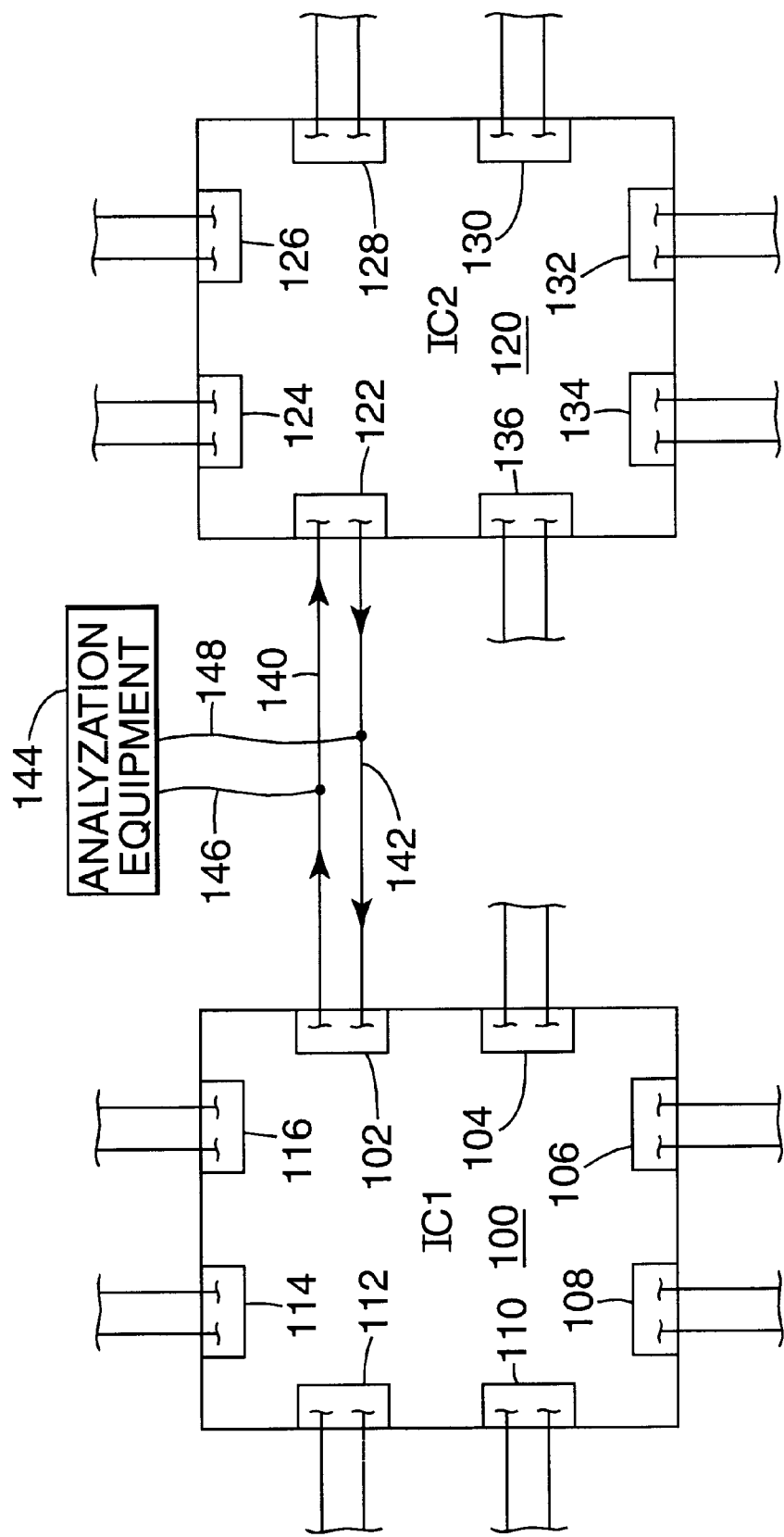
FIG. 1 is an electrical diagram illustrating a prior art analyzation solution for analyzing bi-directional data between two integrated circuits.

FIG. 1 illustrates a standard technique used to directly observe data within bi-directional communication links of a data bus between two integrated circuits to verify the integrity of the system. Integrated circuit 100 includes data ports 102, 104, 106, 108, 110, 112, 114, and 116. Integrated circuit 120 includes data ports 122, 124, 126, 128, 130, 132, 134, and 136. Each data port of data ports 102–116 and 122–136 include bi-directional capabilities such that a first communication link connected to each port facilitates data communication out of the data port while a second communication link connected to the data port facilitates communication of data into the data port. Thus, bi-directional communication of data between two ports of two separate integrated circuits is achieved, such as the bi-directional communication of data between data port 102 of integrated circuit 100 and data port 122 of integrated circuit 120. The arrows on communication links 140 and 142 indicate the movement of data within a corresponding communication link. In some circuit design, communications links 140 and 142 are housed within a data bus, not shown in FIG. 1 for clarity purposes.

It is understood that communication links can be associated with one or more data ports, such as data ports 102–116 and 122–136. However, these communication links are not labeled for clarity purposes. It is also understood that each communication link may be electrically coupled to other communication links within a particular integrated circuit, or may be electrically coupled to various electrical components or subsystems within a given integrated circuit. It is further understood that numerous integrated circuits may be electrically coupled to one another through use of one or more printed circuit boards electrically coupling the integrated circuits.

In order to observe bi-directional communication links 140 and 142, analyzation equipment 144 is connected to communication links 140 and 142 via leads 146 and 148 of analyzation equipment 144. In prior art embodiments, analyzation equipment 144 may consist of various known components or devices, such as either a logic analyzer or an oscilloscope. Analyzation equipment 144 is capable of reading or copying the data which is transmitted between integrated circuits 100 and 120 on communication links 140 and 142. Analyzation equipment 144 facilitates comparing the actual data transmitted on communication links 140 and 142 to expected results in order to verify the integrity of the connection and the functionality of the integrated circuit or system as a whole (hardware and software).

In recent years, both the sophistication and speed of operation of integrated circuits and overall computer systems has rapidly increased due to improvements in integrated circuit methodology and manufacturing technologies resulting in smaller and faster devices. Thus, while prior art systems are capable of operating at frequencies up to the low megahertz range, current computer systems are capable of operating at frequencies in the upper megahertz to low gigahertz range. However, the sophistication and speed of analyzation equipment, such as logic analyzers or oscilloscopes, has not increased in such magnitude. In addition, analyzation equipment 144 is frequently limited such that it is not capable of operating at high frequencies. Thus, analyzation equipment 144, shown in FIG. 1, is not capable of properly observing information from communication links 140 and 142 directly. Rather, the interface of leads 146 and 148 of analyzation equipment to communication links 140 and 142 may result in an undesired load on communication links 140 and 142 such that normal operation is inhibited. In some instances, depending upon the sophistication of analyzation equipment 144 and leads 146 and 148, connection of leads 146 and 148 of analyzation equipment 144 to communication links 140 and 142 may result in a system malfunction or breakdown.

One solution to observing data transmitted on communication links 140 and 142 without interfacing additional equipment onto communication links 140 and 142 is to dedicate an additional data port or ports within either integrated circuit 100 or integrated circuit 120, and their associated data pins, for repeating data received on a communication link. Therefore, the integrity of an integrated circuit, a communication link, or an overall system can be observed without disrupting normal operation. However, this approach is extremely costly in terms of the number of pins of an integrated circuit dedicated solely to a test function. In addition, due to the high frequency to which data is transmitted, prior art systems must de-multiply data to one-half the normal operating frequency and having twice the number of pins. With constantly increasing technology, data pins of an integrated circuit are at a premium and it is difficult to justify utilizing a significant percentage of data pins of an integrated circuit solely for testing purposes, rather than normal operations.

Figure 2:
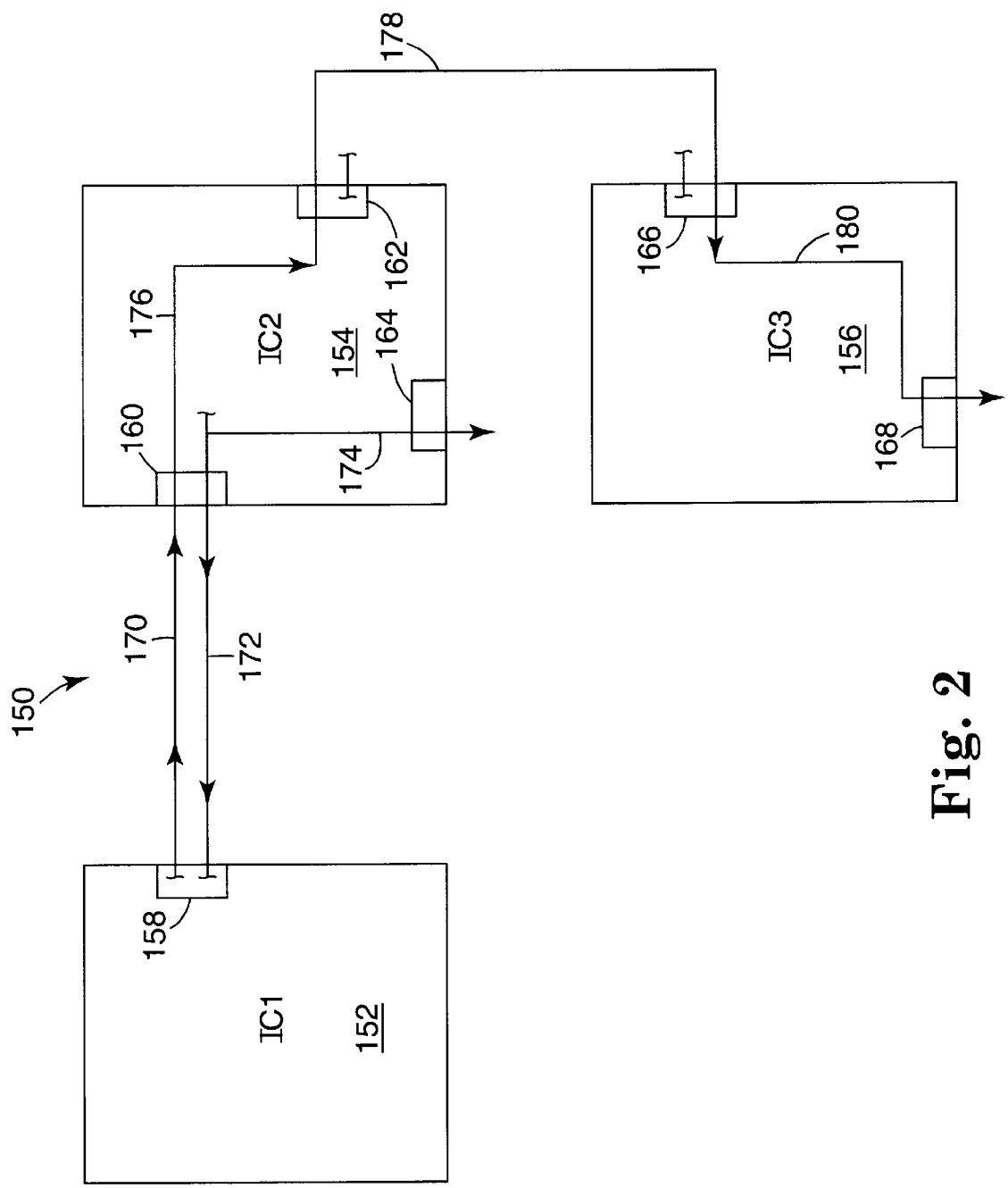
FIG. 2 is an electrical diagram illustrating an analyzation approach to observing a bi-directional communication bus between two integrated circuits in accordance with the present invention.

FIG. 2 is an electrical diagram illustrating one embodiment of the present invention. System 150 includes integrated circuits 152, 154, and 156. Integrated circuits 152, 154, and 156 may each include numerous data ports, such as the data ports shown in FIG. 1 within integrated circuits 100 and 120. However, a minimal number of data ports are shown within FIG. 2 for clarity purposes. In addition, it is understood that each of integrated circuits 152, 154, and 156 may be electrically coupled to any number of integrated circuits or electrical components within system 150 via additional data ports and communication links. It is further understood that one or more printed circuit boards may be utilized to interconnect various integrated circuits and electrical components within system 150. Finally, it is understood that each communication link electrically coupled to a data port of integrated circuits 152, 154, or 156 may be internally connected to other data ports within the same integrated circuit or connected to internal components of the integrated circuit.

As shown in FIG. 2, integrated circuit 152 includes data port 158, while integrated circuit 154 includes ports 160, 162, and 164, and integrated circuit 156 includes ports 166 and 168. Some integrated circuit designs currently being fabricated include a dedicated "debugging" port to facilitate the analyzation process. For example, port 164 of integrated circuit 154 and port 168 of integrated circuit 156 represents a dedicated debugging port. Conversely, ports 160 and 162 of integrated circuit 154 and port 166 of integrated circuit 156 represent standard data ports.

The concept of a debugging port arose as a solution to the analyzation and debugging issues previously described with reference to the prior art circuit of FIG. 1. In addition, while it is important to analyze communication links between integrated circuits or electrical components, it is also important to be able to analyze the internal electrical connections or the operation of an internal specific electrical component within a single integrated circuit. Coupling a single communication link, such as either communication link 170 or 172, to a debugging port, such as debugging port 164 does not alone provide the necessary information for debugging purposes. An analyzation device, such as a logic analyzer or an oscilloscope, can be connected to link 174 exiting debugging port 164. However, observing data between two integrated circuits or electrical components in only a single direction does not permit adequate information. Rather, observation of data in both directions, such as data being transmitted on both communication links 170 and 172 is required. An analogous situation is if a person is listening to one side of a telephone conversation. While the person can gain some information regarding the telephone conversation, without hearing both sides of the conversation, the entire conversation cannot be understood. Similarly, without observing the information being transmitted on both communication links 170 and 172, a complete understanding of the interconnection between integrated circuits 152 and 154 cannot be determined.

While simple solutions to observing bi-directional information, rather than single direction information, is to provide an electrical connection for both communication links 170 and 172 to either debugging port 164 via two separate links or two separate debugging ports via two separate links, these solutions are undesirable. Each set of information from a single communication link, such as communication links 170 and 172, must be transmitted out of a debugging port through numerous pins. The number of pins is dependent upon the amount of data being transmitted and the speed with which the data is being transmitted. For example, a large amount of data or information requires either a large number of pins at a low frequency rate or a smaller amount of pins at a higher frequency rate. However, as previously discussed, the analyzation equipment which will be connected to a debugging port is not capable of operating at elevated frequencies. Thus, providing a debugging port having the large number of pins necessary to transmit data associated with more than one communication links to analyzation equipment is undesirous in that it utilizes a significant percentage of pins for test purposes only. It is difficult to justify the use of a significant percentage of pins of an integrated circuit for test purposes only, rather than for operational purposes, especially in light of present technology needs. Thus, the present invention shown in FIG. 2 utilizes debugging port 164 of integrated circuit 154 as an output mechanism for the data transmitted on communication link 172, while debugging port 168 of integrated circuit 156 is used as an output mechanism for the data on communication link 170.

As shown in FIG. 2, data from communication link 172 is transmitted to debugging port 164 via link 174, which is an internal link of integrated circuit 154. One of the leads of an analyzation device, such as lead 146 of analyzation equipment 144 shown in FIG. 1, can be electrically coupled to the output of link 174 at debugging port 164.

With respect to the data transmitted on communication link 170, this data is forwarded to debugging port 168 of integrated circuit 156 through numerous electrical couplings. First, communication link 170 is electrically coupled to link 176, which is an internal link to integrated circuit 154. Internal link 176 is then coupled to external link 178 via data port 162. Communication link 178 is similar in form to communication links 170 and 172. Communication link 178 is electrically coupled at data port 166 of integrated circuit 156 to link 180. Link 180 is an internal link of integrated circuit 156 and is electrically coupled between data port 166 and debugging port 168. Analyzation equipment, such as analyzation equipment 144 of FIG. 1 can be electrically coupled to the output of debugging port 168 through use of an electrical lead, such as electrical lead 148 shown in FIG. 1.

By utilizing two separate debugging ports, such as debugging ports 164 and 168, of two separate integrated circuits, such as integrated circuits 154 and 156, the number of output pins within either debugging port can be minimized. For example, in one preferred embodiment, debugging port 164 and 168 each include in the range of approximately 50–250 data pins. Therefore, a maximum number of output pins of an integrated circuit can be used for operational purposes, rather than analyzation purposes.

In order for the present invention shown in FIG. 2 to properly operate, it is understood that debugging port 168 of integrated circuit 156 can not be simultaneously used for debugging purposes of integrated circuit 156. In some instances, a debugging port of an integrated circuit, such as integrated circuit 156, is not used. Perhaps due to the nature of the integrated circuit and its interconnections, there is not reason to debug any aspect of the integrated circuit. In other instances, debugging port 168 of integrated circuit 156 may alternatively provide debugging information for integrated circuits 152 and 156 via additional electrical connections within integrated circuit 156 to debugging port 168 not shown for clarity purposes.

Figure 3:
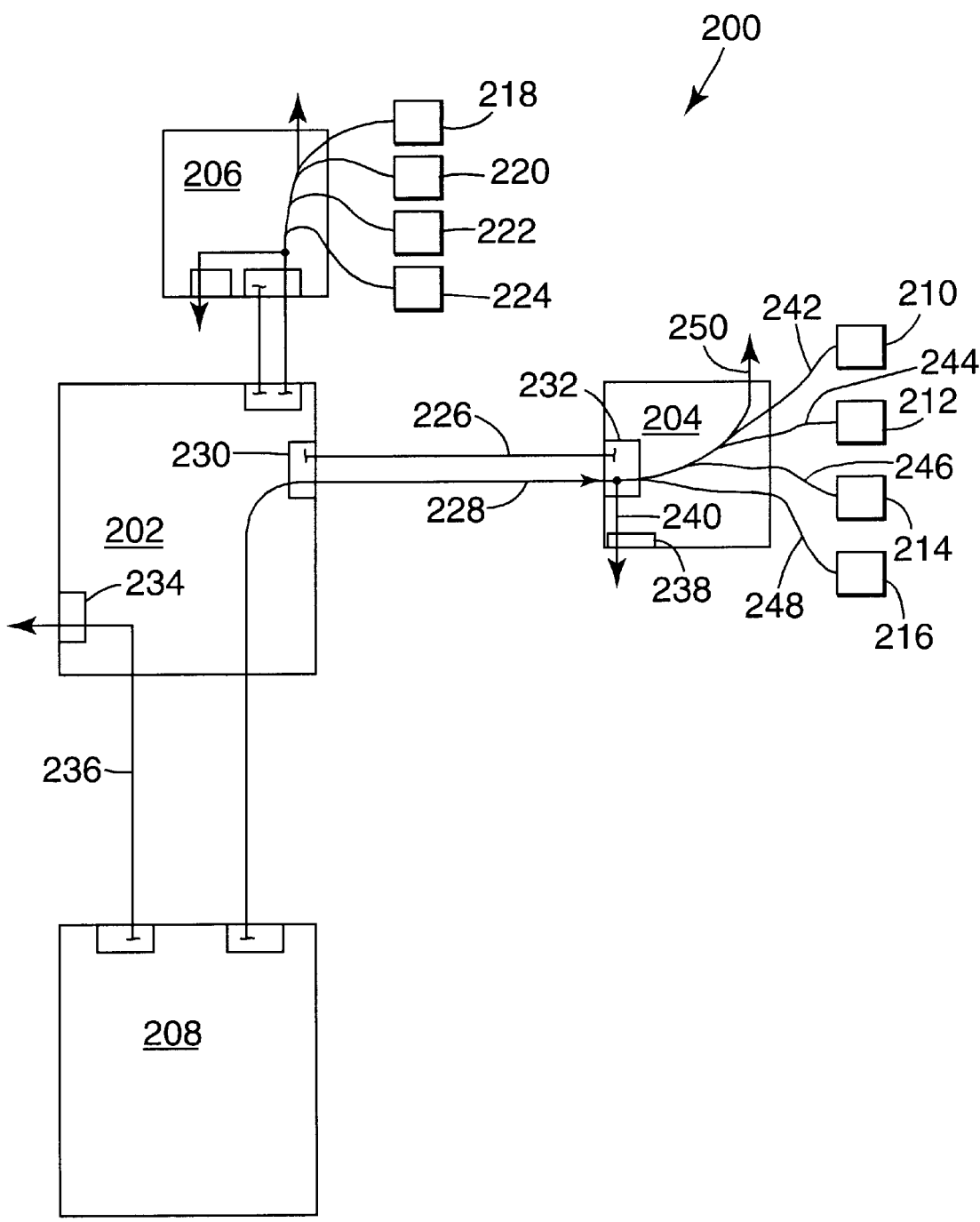
FIG. 3 is an electrical diagram illustrating another embodiment of an analyzation approach to observing a bi-directional communication bus transmitted between two integrated circuits in accordance with the present invention.

FIG. 3 is an electrical diagram illustrating another embodiment of the present invention. System 200, shown in FIG. 3, includes integrated circuits 202, 204, 206, and 208, and microprocessors 210, 212, 214, 216, 218, 220, 222, and 224. System 200, shown in FIG. 3, is similar to system 150, shown in FIG. 2, in that data information on a communication link between two integrated circuits is provided to a third integrated circuit for electrically coupling the data to analyzation equipment. In system 200, it is assumed that the debugging ports of all integrated circuits are electrically coupled to other communication links or that the debugging ports cannot facilitate the transfer of data information due to quantity and speed constraints. Therefore, the communication links to be analyzed are electrically coupled to other data ports of integrated circuits which are either not used at all or not used within specific time intervals.

As shown in FIG. 3, communication links 226 and 228 are interconnected between ports 230 and 232 of integrated circuits 202 and 204, respectively. However, debugging port 234 of integrated circuit 202 is dedicated to electrically coupling data from communication link 236 to an external source. Thus, debugging port 234 of integrated circuit 202 is not available. Thus, a portion of the data from communication link 228 is electrically coupled to debugging port 238 of integrated circuit 204 via link 240. However, some integrated circuit chips, such as integrated circuit 204, are designed such that their debugging ports include a minimal number output pins, for reasons previously discussed. Therefore, all information from communication link 228 cannot be forwarded out of debugging port 238 at the frequency of the system. Therefore, while some information is forwarded out of debugging port 238, the remaining information can be forwarded out of links 242, 244, 246, 248, or 250, as will be described. It is understood that a data port is associated with each of links 242, 244, 246, 248, and 250, but is not shown for clarity purposes.

Depending upon the design of system 200, integrated circuit 204 can be electrically coupled to numerous integrated circuits or microprocessors, such as up to 16 or 32 microprocessors. However, the design of many systems do not include the maximum number of microprocessors. Therefore, some communication links or data buses, such as communication link 250, is not utilized. Therefore, analyzation equipment, such as analyzation equipment 144, can be electrically coupled to communication link 250 as previously discussed. With respect to data buses or communication links 242, 244, 246, and 248, analyzation equipment can be connected to these communication links at times in which microprocessors 210, 212, 214, and 216 are not operating. Thus, during non-operational time intervals, debugging information can be transmitted on these lines. A similar discussion applies to integrated circuit 206 and microprocessors 218, 220, 222, and 224. Thus, communication links 226 and 228 can be electrically coupled to any data port of integrated circuit 204 not currently being used, such as the data ports associated with links 242, 244, 246, 248, and 250. An analyzation device can be coupled to the specific port and diagnostic functions can be completed.

The embodiment shown in FIG. 3 utilizes various data ports of an integrated circuit which are not dedicated debugging ports to facilitate observation and analyzation of data on a communication link. With increasing technology, it is necessary to provide unique solutions for testing integrated circuits or individual components of an overall system through use of a minimal number of output pins. The present invention provides such a solution. In addition, the present invention no longer requires that analyzation equipment is directly coupled to communication links during normal operations, which may adversely affect the operation of the system.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system for observing bi-directional information transmitted on a first and a second communication link electrically connected to a first integrated circuit, the system comprising:
a second integrated circuit electrically coupled to the first and second communication links, the second integrated circuit further comprising:
a first data port electrically coupled to the first and second communication links;
a second data port electrically coupled to the first communication link of the first data port;
a third data port electrically coupled to the second communication link of the first data port, the third data port capable of electrical connection with an analyzing device;
a third integrated circuit further comprising:
a first data port;
a second data port electrically coupled to the first data port, the second data port capable of electrical connection with the analyzing device; and
a third communication link electrically coupling the second data port of the second integrated circuit to the second data port of the third integrated circuit.

2. The system of claim 1, wherein the third data port of the second integrated circuit is a dedicated debugging port.

3. The system of claim 1, wherein the second data port of the third integrated circuit is a dedicated debugging port.

4. The system of claim 1, wherein the first communication link is a dedicated input link and the second communication link is a dedicated output link.

5. The system of claim 1, wherein the third data port of the second integrated circuit includes in the range of approximately 50–250 data pins.

6. The system of claim 1, wherein the second data port of the third integrated circuit includes in the range of approximately 50–250 data pins.

7. A system for observing bi-directional information transmitted on a first and a second communication link between a first data port of a first integrated circuit and a first data port of a second integrated circuit, the system comprising:

a second data port of the second integrated circuit, the second data port electrically coupled to the first data port of the second integrated circuit for receiving information from the first communication link, the second data port capable of electrical connection with an analyzing device;

a third data port of the second integrated circuit, the third data port electrically coupled to the first data port of the second integrated circuit for receiving information from the second communication link;

a third communication link electrically coupling the third data port of the second integrated circuit to a first data port of a third integrated circuit; and a second data port of the third integrated circuit, the second data port electrically coupled to the first data port of the third integrated circuit for receiving information from the second communication link, the second data port capable of electrical connection with the analyzing device.

8. The system of claim 7, wherein the second data port of the second integrated circuit is a dedicated debugging port.

9. The system of claim 8, wherein the second data port of the third integrated circuit is a dedicated debugging port.

10. The system of claim 7, wherein the first communication link is a dedicated input link and the second communication link is a dedicated output link.

11. The system of claim 7, wherein the second data port of the second integrated circuit includes in the range of approximately 50–250 data pins.

12. The system of claim 7, wherein the second data port of the third integrated circuit includes in the range of approximately 50–250 data pins.

13. A method of observing bi-directional information transmitted on a first and a second communication link electrically connected between a first data port of a first integrated circuit and a first data port of a second integrated circuit, the method comprising:

electrically coupling the first communication link from the first data port of the second integrated circuit to a second data port of the second integrated circuit;

electrically coupling the second communication link from the first data port of the second integrated circuit to a third data port of the second integrated circuit;

electrically coupling the second communication link from the third data port to a first data port of a third integrated circuit;

electrically coupling the second communication link from the first data port of the third integrated circuit to a second data port of the third integrated circuit; and wherein observation of the first communication link at the second port of the second integrated circuit and the second communication at the second data port of the third integrated circuit is achieved by an analyzing device electrically coupled to the second data ports of the second and third integration circuits.

14. The method of claim 13, wherein the step of electrically coupling the first communication link from the first data port of the second integrated circuit to the second data port of the second integrated circuit further comprises:

electrically coupling a dedicated input link from the first data port of the second integrated circuit to a dedicated debugging port of the second integrated circuit.

15. The method of claim 13, wherein the step of electrically coupling the first communication link from the first data port of the second integrated circuit to the second data port of the second integrated circuit further comprises:

electrically coupling a dedicated output link from the first data port of the second integrated circuit to a dedicated debugging port of the second integrated circuit.

16. The method of claim 13, wherein the step of electrically coupling the second communication link from the first data port of the third integrated circuit to a second data port of the third integrated circuit further comprises:

electrically coupling a dedicated input link from the first data port of the third integrated circuit to a dedicated debugging port of the third integrated circuit.

17. The method of claim 13, wherein the step of electrically coupling the second communication link from the first data port of the third integrated circuit to a second data port of the third integrated circuit further comprises:

electrically coupling a dedicated output link from the first data port of the third integrated circuit to a dedicated debugging port of the third integrated circuit.

\* \* \* \* \*